United States Patent [19]

Koba et al.

[11] Patent Number: 4,777,151

[45] Date of Patent: Oct. 11, 1988

[54] GLASS-CERAMIC PRODUCT AND METHOD OF MAKING THE SAME

[75] Inventors: Keiichiro Koba; Akria Mathumoto; Yoshinori Koyanagi; Toshio Hamasaki; Katsuya Eguchi, all of Tochigi, Japan

[73] Assignee: Mitsui Mining Company, Limited, Tokyo, Japan

[21] Appl. No.: 848,482

[22] Filed: Apr. 7, 1986

[30] Foreign Application Priority Data

Jul. 3, 1985 [JP] Japan .................. 60-144555

[51] Int. Cl.$^4$ .............................................. C03C 10/16
[52] U.S. Cl. ......................................... 501/3; 501/12; 501/57; 501/73
[58] Field of Search .................... 501/3, 12, 57, 73

[56] References Cited

U.S. PATENT DOCUMENTS

| | | | |
|---|---|---|---|
| 3,689,293 | 9/1972 | Beall | 501/3 O |
| 3,759,683 | 9/1973 | Dislich et al. | 501/12 X |
| 3,905,824 | 9/1975 | Grossman | 501/3 O |
| 3,997,352 | 12/1976 | Beall | 501/3 O |
| 4,266,978 | 5/1981 | Prochazka | 501/12 X |
| 4,390,634 | 6/1983 | Hoda | 501/3 O |
| 4,414,281 | 11/1983 | Hoda | 501/3 X |
| 4,431,420 | 2/1984 | Adair | 501/3 X |

FOREIGN PATENT DOCUMENTS

| | | | |
|---|---|---|---|
| 0132332 | 9/1978 | Fed. Rep. of Germany | 501/3 |
| 215548 | 10/1985 | Japan . | |

*Primary Examiner*—William R. Dixon, Jr.
*Assistant Examiner*—Karl Group
*Attorney, Agent, or Firm*—Oblon, Fisher, Spivak, McClelland & Maier

[57] ABSTRACT

Disclosed is a glass-ceramic product having a chemical composition, as expressed in terms of oxides with the exception of F, in the weight range of 35 to 60% $SiO_2$, 10 to 20% $Al_2O_3$, 12 to 25% MgO, 5 to 15% $K_2O$ and 4 to 15% F, containing no $B_2O_3$, and containing 40 to 70% by weight of fluorophlogopite microcrystals. This glass-ceramic product has a flexural strength of not less than 1500 kgf/cm$^2$, a heat resistance of about 1100° C., excellent dielectric properties and good machinability, and is a material capable of extending the range of use of high performance ceramics.

The aforesaid glass-ceramic product can be made by dissolving, in a solvent consisting essentially of a polar solvent, compounds (consisting largely of alkoxide compounds) of the metallic components and a fluorine compound in such proportions as to give a final product having the aforesaid chemical composition, hydrolyzing these compounds, dehydrating and drying the resulting gel, and heat-treating the resulting dry solid.

7 Claims, No Drawings

GLASS-CERAMIC PRODUCT AND METHOD OF MAKING THE SAME

TECHNICAL FIELD

This invention relates to glass-ceramics having mirocrystals of mica dispersed in the vitreous matrix, and a method of making the same.

BACKGROUND ART

Glass-ceramics having microcrystals of mica dispersed in the vitreous matrix have excellent dielectric properties, high resistance to thermal shock, and good machinability, and are considered to be promising materials capable of extending the range of use of high performance ceramics. Among others, glass-ceramics having microcrystals of fluorophlogopite dispersed therein are especially preferred materials because they additionally have excellent high-temperature stability.

As disclosed in Japanese Patent Publication No. 34775/'79 and U.S. Pat. No. 3,689,293 with the declaratio of priority, there is a known method of making such glass-ceramics which comprises preparing a powder mixture of starting materials in such proportions as to give a final product having a chemical composition capable of forming and containing a required amount of fluorophlogopite microcrystals, heating the powder mixture at a high temperature of at least about 1400° C. to melt it and thereby form a vitreous matrix, cooling and solidifying the melt while forming it into a shape desired for the final product, and again heat-treating the shaped body at a high temperature of 750° to 1100° C. for a long period of time to obtain the desired product. In this method, the powder mixture must be heated at a high temperature of at least about 1400° C. in order to melt it and form a homogeneous amorphous matrix. However, when the powder mixture containing a high proportion of fluorine is heated at such a high temperature, its reactivity is increased to cause considerable damage to the vessel used for the heating. Moreover, when a shaped body of large size is formed by pouring the melt into a desired mold and solidifying it, the temperature difference between the surface region and inner part of the shaped body being cooled is unavoidably increased as the temperature of the melt becomes higher. Thus, the solidified material is not uniform in structure between the surface region and inner part thereof and, in turn, the final product obtained after heat treatment is also inhomogeneous. Accordingly, it has been difficult to make large-sized products of good quality. In addition, this method has the disadvantage of involving a much greater heat energy cost because it includes the steps of heating the starting materials at about 1400° C. to melt them, cooling and solidifying the melt, and again heat-treating the shaped body at 750°–1100° C.

Furthermore, this method involves the addition of $B_2O_3$ for the purpose of reducing the softening point required for vitrification and promoting the growth of fluorophlogopite crystals. However, the inherently low melting point of $B_2O_3$ is disadvantageous in that the resulting product has a reduced flexural strength and a heat resistance of as low as 1000° C. or below.

According to another known method, glass-ceramics are made by mixing finely powdered fluorophlogopite crystals with a binder having a lower melting point (such as glass, phosphates, low-melting mica, etc.) and sintering this mixture. This method can cut down the great heat energy cost which constitutes one disadvantage of the foregoing method. However, the heat resistance is reduced because of its dependence on the melting point of the binder used for the formation of a matrix and the content of fluorophlogopite cannot be increased satisfactorily, so that the quality of the resulting product is deteriorated.

In order to overcome these disadvantages, the present inventors developed a new method of making glass-ceramics containing fluorophlogopite microcrystals which comprises mixing alkoxide compounds of silicon, aluminum, magnesium, potassium and boron with a fluorine compound, adding water to the mixture so as to effect hydrolysis of the aforesaid compounds, dehydrating and drying the resulting gel, and heat-treating the resulting dry solid at a temperature lower than its softening point (Japanese Patent Laid-Open No. 215548/'85). However, since the products made by this method still contain $B_2O_3$, their flexural strength has an upper limit of 1200 kgf/cm$^2$ and their heat resistance is as low as about 1000° C.

As the range of use of glass-ceramic products is extended in recent years, there is a growing demand for glass-ceramic products having greater flexural strength and higher heat resistance while retaining their excellent machinability.

DISCLOSURE OF THE INVENTION

The present invention is intended to meet the aforesaid demand, and it is an object thereof to provide a glass-ceramic product which has a flexural strength of not less than 1500 kgf/cm$^2$, a heat resistance of about 1100° C., excellent dielectric properties and good machinability, and thereby overcomes the above-described disadvantages of the prior art, as well as a method of making such glass-ceramic products.

According to the present invention, there is provided a glass-ceramic product having a chemical composition, as expressed in terms of oxides with the exception of F, in the weight range of 35 to 60% $SiO_2$, 10 to 20% $Al_2O_3$, 12 to 25% $MgO$, 5 to 15% $K_2O$ and 4 to 15% F, containing no $B_2O_3$, and containing 40 to 70% by weight of fluorophlogopite microcrystals.

According to the present invention, there is also provided a method of making glass-ceramic products as described above. Specifically, glass-ceramic products containing 40 to 70% by weight of fluorophlogopite microcrystals can be made by dissolving, in a solvent consisting essentially of a polar solvent, (i) silicon, aluminum and magnesium compounds consisting largely of alkoxides thereof and (ii) potassium and fluorine compounds soluble in the solvent, in such proportions as to give a final product having a chemical composition, as expressed in terms of oxides with the exception of F, in the weight range of 35 to 60% $SiO_2$, 10 to 20% $Al_2O_3$, 12 to 25% $MgO$, 5 to 15% $K_2O$ and 4 to 15% F; adding water to the starting material solution so formed to effect hydrolysis of the aforesaid compounds; dehydrating and drying the resulting gel; and heat-treating the resulting dry solid.

BEST MODE FOR CARRYING OUT THE INVENTION

The proportions of the starting materials used in the method of the present invention should be, as described above, such that the final product will have a chemical composition, as expressed in terms of oxides with the exception of F, in the weight range of 35 to 60% $SiO_2$, 10 to 20% $Al_2O_3$, 12 to 25% MgO, 5 to 15% $K_2O$ and 4 to 15% F, and will not contain any $B_2O_3$. The glass-ceramic product of the present invention has a structure comprising a glass matrix of a chemical composiion similar to that of silicate glass and microcrystals of fluorophlogopite ($KMg_3AlSi_3O_{10}F_2$) uniformly dispersed therein. If the proportion of each material deviates from the above-defined respective range, the content of fluorophlogopite microcrystals in the resulting glass-ceramic product may deviate from the above-defined range, or large amounts of crystals of undesired compounds such as $Mg_2SiO_4$ and the like may be formed, resulting in a failure to obtain a glass-ceramic product in accordance with the present invention, i.e., one having a flexural strength of not less than 1500 $kgf/cm^2$, a heat resistance of about 1100° C., excellent dielectric properties and good machinability. More specifically, if the $Al_2O_3$, $K_2O$ and F contents deviate from the above-defined ranges, the fluorophlogopite microcrystal content of the product will be decreased and, moreover, the chemical composition of the vitreous matrix will be changed, resulting in a failure to obtain a desired glass-ceramic product having excellent machinability. If the $SiO_2$ content is greater than its upper limit, the amount of glass present in the glass-ceramic product will be increased and the amount of fluorophlogopite microcrystals will be decreased, thus deteriorating the machinability of the product. On the contrary, if the $SiO_2$ content is less than its lower limit, the fluorophlogopite content of the product will be within the specified range, but the calcination step (third-stage heat treatment) may fail to achieve adequate sintering, again deteriorating the quality of the product. If the MgO content is greater than its upper limit, the time required for the formation of a gel by hydrolysis of the alkoxides will become so short that the resulting gel will tend to be hard for handling. Moreover, the fluorophlogopite content of the glass-ceramic product will exceed its upper limit and the calcination step may fail to achieve adequate sintering, thus deteriorating the quality of the product. On the contrary, if the MgO content is less than its lower limit, the amount of glass present in the product will be increased and the content of fluorophlogopite microcrystals will be decreased, thus deteriorating the machinability of the product.

Although the starting materials containing the metallic components (i.e., Si, Al, Mg and K) may preferably comprise alkoxide compounds thereof, all of the metallic components need not be used in the form of alkoxide compounds. Specifically, up to 100% of K, up to about 20% of Al, up to about 10% of Si, and up to about 10% of Mg may be used in the form of other compounds soluble in polar solvents. For example, halides (such as $AlCl_3$, etc.), silicofluorides (such as $K_2SiF_6$, $MgSiF_6$, etc.) and/or nitrates (such as $Al(NO_3)_3$, etc.) may be substitutively used within the aforesaid ranges.

As the alkoxide compounds, alkoxides having a lower alkyl group, in particular, a $C_1$- to $C_4$-alkyl group are preferably used, partly because they can readily be prepared.

As the fluorine compound, there may be used any fluorine compound that is soluble in polar solvents. Specific examples thereof include 3-aminobenzotrifluoride ($NH_2C_6H_4CF_3$), $K_2SiF_6$, $MgSiF_6$, KF and the like.

Preferred examples of the polar solvent include alcohols (such as $C_1$- to $C_3$-alcohols), ketones (such as acetone, methyl ethyl ketone, acetophenone, etc.) and the like. The polar solvent may suitably be used in an amount of 5 to 15 liters per kilogram of the glass-ceramic product. In some cases, alkoxide compounds which are sparingly soluble in polar solvents may be used in the form of a solution in a non-polar solvent such as benzene, toluene, xylene or the like, or alkoxide compounds prepared by the use of a non-polar solvent may be used without removing the non-polar solvent. However, it is to be understood that, even if the solution of the starting materials contains non-polar solvents in an amount of about 1 to 5 liters per kilogram of the glass-ceramic product, no adverse influence is exerted on the practice of the present invention.

The hydrolysis conditions employed in the method of the present invention are as follows: The amount of water used should be 1 to 10 times the stoichiometric amount required for the hydrolysis of the alkoxides. For example, the stoichiometric amount of water required to hydrolyze 1 mole of $Si(OC_2H_5)_4$ is 4 moles. If the amount of water used is too small, the amount of fluorophlogopite formed will be decreased, while if it is too large the various alkoxides will be hydrolyzed at markedly different rates. Since the hydrolysis products are converted into a gel under continuously heated conditions, such markedly different hydrolysis rates may result in the formation of an inhomogeneous gel. The pH used in the hydrolysis step should preferably be not lower than 6.5. If the pH is lower, the silicon alkoxide will be hydrolyzed more slowly, resulting in the formation of an inhomogeneous gel. As a result, undesired compounds (e.g., $Mg_2SiO_4$) other than fluorophlogopite may be formed in the glass-ceramic product. The temperature used in the hydrolysis step should be in the range of 25° to 100° C., the preferred temperatue being about 60° C.

Thus, by adding water to the mixed solution of the alkoxide compounds (in which, if desired, a part of the alkoxide compounds may be replaced by non-alkoxide compounds soluble in polar solvents), the alkoxide compounds are hydrolyzed. After completion of the hydrolysis, the heating is continued at a temperature of 40° to 100° C., during which the reaction system gradually changes into a gel. The resulting gel is dehydrated and dried by heating at a temperature of 25° to 130° C., and thereafter heated at a temperature of 500° to 800° C. for a period of 1 to 12 hours (first-stage heat treatment). During this first-stage heat treatment, the gel changes into an amorphous material and produces sellaite which will ultimately be converted into fluorophlogopite. Subsequently, the amorphous material is heated at a temperature of 800° to 1100° C. for a period of 1 to 12 hours (second-stage heat treatment), so that seed crystals of fluorophlogopite are formed on sellaite nuclei. Thus, by carrying out the pretreatment step in two stages, the formation of fluorophlogopite crystal nuclei is facilitated and the quality of the resulting product is improved. The intermediate product thus obtained is liable to deformation because, during this pretreatment step, a volume shrinkage is caused by the evaporation of the solventand the excess water. Accordingly, it is preferable to reduce the intermediate product to fine powder at this point, form the fine powder into a desired shape, and calcine the shaped body at a temperature of 1100° to 1300° C. for a period of 1 to 15 hours (third-stage heat treatment). This heat treatment promotes the growth of fluorophlogopite microcrystals dispersed in the amorphous matrix of the shaped body and ultimately yields a desired glass-ceramic product having a high content of fluorophlogopite microcrystals.

In the pretreatment step, it is necessary to form as many fluorophlogopite microcrystal nuclei as possible. To this end, for example, the method disclosed in Japanese Patent Laid-Open No. 215548/'85 involves the addition of $B_2O_3$ as a nucleating aid.

In contrast, the method of the present invention accomplishes the aforesaid purpose not by adding a special assistant such as $B_2O_3$, but by improving the heat-treating conditions of the pretreatment step and the calcination step. Thus, there can be obtained a product containing smaller fluorophlogopite microcrystals more densely distributed therein and having greater flexural strength and higher heat resistance, as compared with the product obtained by the method of Japanese Patent Laid-Open No. 215548/'85.

The glass-ceramic products of the present invention contain 40 to 70% by weight of fluorophlogopite microcrystals. Examination of their crystal structure by electron microscopy reveals that flaky microcrystals, about 10 $\mu$m in size, of fluorophlogopite are uniformly and densely distributed throughout the vitreous matrix.

The glass-ceramic products of the present invention contain more than 40% by weight of fluorophlogopite microcrystals and, therefore, have very excellent machinability. That is, they can be readily pierced with a drill or cut with a lathe and the like. Moreover, when heated at a temperature of about 1100° C. for a long period of time, these glass-ceramic products do not undergo any shrinkage, deformation or reduction in strength, and has adequate strength for use as mechanical components. Specifically, they have greater flexural strength and higher heat resistance than prior art products.

The present invention is further illustrated by the following examples. In these examples, all parts are by weight.

In the following examples and comparative examples, the machinability of a product was evaluated by cutting the product on a lathe under fixed cutting conditions (i.e., a cutting speed of 50 m/min., a depth of cut of 0.5 mm, and a feed rate of 0.05 mm/rev.) and rating its machinability on the basis of the flank wear of the single point tool, the magnitude of cutting resistance, and the resulting surface finish. More specifically, by determining (1) the cut length at which the flank wear of the single point tool reached a certain level, (2) the magnitude of the cutting force (principal cutting force, feed force and thrust force) exerted on the single point tool during the cutting process, and (3) the state of the finished surface, the performance of the product was evaluated in comparison with samples of commercially available free-cutting ceramics. The heat resistance of a product is expressed as the maximum temperature to which the product could be exposed for 10 hours without reducing its flexural strength by 20% or more.

Fluorophlogopite content, or the degree of crystallinity, was determined as follows: A calibration curve was prepared by powder X-ray diffraction analysis of fine powder mixtures formed by mixing silicate glass with various known proportions (ranging from 10 to 80% by weight) of fluorophlogopite. Using this curve, the fluorophlogopite content of an unknown glass-ceramic product was determined from the height of its X-ray diffraction peak.

EXAMPLE 1

163 parts of silicon tetraethoxide [$Si(OC_2H_5)_4$], 36 parts of magnesium methoxide [$Mg(OCH_3)_2$], 16 parts of potassium methoxide ($KOCH_3$) and 25 parts of 3-aminobenzotrifluoride ($NH_2C_6H_4CF_3$) were used as starting materials and dissolved in 1200 parts of methanol. To the resulting solution was added a solution of 64 parts of aluminum isopropoxide [$Al(O\text{-iso }C_3H_7)_3$] in 300 parts of benzene. Then, 204 parts of water adjusted to pH 11 was added to the resulting mixture so as to effect hydrolysis at about 60° C. Thereafter, the heating was continued at the same temperature until the solution was perfectly converted into a white gel. The gel was separated and dried at 110° C. to obtain 130 parts of a dry solid. This dry solid was crushed and heat-treated at 700° C. for 4 hours and then at 1000° C. for 4 hours to obtain 103 parts of an amorphous material. This material was reduced to powder, granulated and pressed at 600 kgf/cm$^2$, and the resulting shaped body was subjected to a third-stage heat treatment (1200° C., 4 hours). When the white glass-ceramic product thus obtained was examined by electron microscopy, it was confirmed that fluorophlogopite crystals were uniformly dispersed in the vitreous matrix and its degree of crystallinity was 45%. Moreover, X-ray diffraction analysis revealed the presence of fluorophlogopite and a slight amount of sellaite.

This glass-ceramic product had good machinability and exhibited a flexural strength of 2100 kgf/cm$^2$.

EXAMPLES 2 TO 23

Glass-ceramic products were made in the same manner as described in Example 1, except that the amounts of alkoxide compounds and fluorine compound used were modified so as to give final products having the respective chemical compositions (as expressed in terms of oxides with the exception of fluorine) indicated in Table 1, and the heat-treating conditions were modified as indicated in Table 1. The results thus obtained, together with those of Example 1, are shown in Table 1.

EXAMPLES 24 TO 34

Glass-ceramic products were made by replacing a part of an alkoxide compound used as a starting material by another compound soluble in polar solvents. The results thus obtained are shown in Table 2. As is evident from Table 2, glass-ceramic products having almost equal properties could be obtained even when a part of an alkoxide compound was replaced by another compound soluble in polar solvents. The heat-treating conditions used in this example were the same as described in Example 1.

COMPARATIVE EXAMPLE 1

A glass-ceramic product was made by using $B_2O_3$ as a sintering aid in an amount equivalent to 7% by weight and calcining the dry solid in two stages. The properties of this product are shown in Table 3. This product had lower flexural strength and heat resistance than those obtained in the foregoing examples.

COMPARATIVE EXAMPLES 2 TO 17

Glass-ceramic products were made by changing the proportion of each component substantially and using the same heat-treating conditions as described in Example 1. The results thus obtained are shown in Table 4.

It can be seen from Table 4 that, if the proportion of each component deviates substantially from its specified range, the amount of fluorophlogopite crystals formed may be changed and undesirable crystalline components may be produced as by-products, thus exerting an adverse influence on the machinability and sinterability of the product.

TABLE 1

| Example No. | Chemical composition (in terms of oxides, except F), wt. % | | | | | Heat-treating conditions | | | | | | | Properties of product | | | |
|---|---|---|---|---|---|---|---|---|---|---|---|---|---|---|---|---|
| | | | | | | First stage | | Second stage | | Third stage | | | | | | Fluorophlogopite |
| | SiO$_2$ | Al$_2$O$_3$ | MgO | D$_2$O | F | Temperature (°C.) | Time (hr.) | Temperature (°C.) | Time (hr.) | Temperature (°C.) | Time (hr.) | Machinability | Flexural strength (kgf/cm$^2$) | Heat resistance (°C.) | Crystalline phase | crystal content (wt. %) |
| 1 | 47.0 | 16.0 | 17.0 | 11.0 | 9.0 | 700 | 4 | 1000 | 4 | 1200 | 4 | Very good | 2100 | 1200 | Fluorophlogopite Sellaite | 45 |
| 2 | 37.0 | 19.0 | 20.2 | 13.1 | 10.7 | 700 | 4 | 1000 | 4 | 1200 | 4 | Good | 1630 | 1150 | Fluorophlogopite Sellaite | 60 |
| 3 | 58.0 | 12.7 | 13.5 | 8.7 | 7.1 | 700 | 4 | 1000 | 4 | 1200 | 4 | Good | 1710 | 1125 | Fluorophlogopite Sellaite | 45 |
| 4 | 49.3 | 12.0 | 17.8 | 11.5 | 9.4 | 700 | 4 | 1000 | 4 | 1200 | 4 | Good | 1620 | 1100 | Fluorophlogopite Sellaite | 50 |
| 5 | 45.9 | 18.0 | 16.6 | 10.7 | 8.8 | 700 | 4 | 1000 | 4 | 1200 | 4 | Good | 1690 | 1100 | Fluorophlogopite Sellaite | 45 |
| 6 | 49.8 | 17.0 | 12.0 | 11.7 | 9.5 | 700 | 4 | 1000 | 4 | 1200 | 4 | Good | 1540 | 1100 | Fluorophlogopite Sellaite | 40 |
| 7 | 43.7 | 14.8 | 23.0 | 10.2 | 8.3 | 700 | 4 | 1000 | 4 | 1200 | 4 | Good | 1780 | 1125 | Fluorophlogopite Sellaite | 70 |
| 8 | 50.2 | 17.1 | 18.1 | 5.0 | 9.6 | 700 | 4 | 1000 | 4 | 1200 | 4 | Good | 1520 | 1100 | Fluorophlogopite Sellaite | 55 |
| 9 | 45.4 | 15.5 | 16.4 | 1.40 | 8.7 | 700 | 4 | 1000 | 4 | 1200 | 4 | Good | 1740 | 1150 | Fluorophlogopite Sellaite | 45 |
| 10 | 49.1 | 16.7 | 17.7 | 11.5 | 5.0 | 700 | 4 | 1000 | 4 | 1200 | 4 | Good | 1540 | 1100 | Fluorophlogopite Sellaite | 50 |
| 11 | 45.5 | 15.5 | 16.4 | 10.6 | 12.0 | 700 | 4 | 1000 | 4 | 1200 | 4 | Good | 1520 | 1100 | Fluorophlogopite Sellaite | 45 |
| 12 | 47.0 | 16.0 | 17.0 | 11.0 | 9.0 | 500 | 4 | 1000 | 4 | 1200 | 4 | Very good | 1820 | 1175 | Fluorophlogopite Sellaite | 45 |
| 13 | 47.0 | 16.0 | 17.0 | 11.0 | 9.0 | 800 | 4 | 1000 | 4 | 1200 | 4 | Very good | 1880 | 1175 | Fluorophlogopite Sellaite | 45 |
| 14 | 47.0 | 16.0 | 17.0 | 11.0 | 9.0 | 700 | 2 | 1000 | 4 | 1200 | 4 | Good | 1720 | 1125 | Fluorophlogopite Sellaite | 45 |
| 15 | 47.0 | 16.0 | 17.0 | 11.0 | 9.0 | 700 | 10 | 1000 | 4 | 1200 | 4 | Very good | 1840 | 1175 | Fluorophlogopite Sellaite | 45 |
| 16 | 47.0 | 16.0 | 17.0 | 11.0 | 9.0 | 700 | 4 | 800 | 4 | 1200 | 4 | Good | 1860 | 1175 | Fluorophlogopite Sellaite | 45 |
| 17 | 47.0 | 16.0 | 17.0 | 11.0 | 9.0 | 700 | 4 | 1100 | 4 | 1200 | 4 | Very good | 2020 | 1150 | Fluorophlogopite Sellaite | 45 |
| 18 | 47.0 | 16.0 | 17.0 | 11.0 | 9.0 | 700 | 4 | 1000 | 2 | 1200 | 4 | Good | 1950 | 1125 | Fluorophlogopite Sellaite | 45 |
| 19 | 47.0 | 16.0 | 17.0 | 11.0 | 9.0 | 700 | 4 | 1000 | 10 | 1200 | 4 | Very good | 2040 | 1175 | Fluorophlogopite Sellaite | 45 |
| 20 | 47.0 | 16.0 | 17.0 | 11.0 | 9.0 | 700 | 4 | 1000 | 4 | 1150 | 4 | Very good | 1900 | 1175 | Fluorophlogopite Sellaite | 45 |
| 21 | 47.0 | 16.0 | 17.0 | 11.0 | 9.0 | 700 | 4 | 1000 | 4 | 1250 | 4 | Very good | 2050 | 1175 | Fluorophlogopite Sellaite | 45 |
| 22 | 47.0 | 16.0 | 17.0 | 11.0 | 9.0 | 700 | 4 | 1000 | 4 | 1200 | 2 | Good | 1760 | 1150 | Fluorophlogopite Sellaite | 45 |
| 23 | 47.0 | 16.0 | 17.0 | 11.0 | 9.0 | 700 | 4 | 1000 | 4 | 1200 | 12 | Very good | 2080 | 1175 | Fluorophlogopite Sellaite | 45 |

TABLE 2

| | Replacement of starting material | | | Properties of product | | | | |
|---|---|---|---|---|---|---|---|---|
| Example No. | Replaced material (alkoxide) | Replacing material | Degree of replacement (%) | Machinability | Flexural strength (kgf/cm$^2$) | Heat resistance (°C) | Crystalline phase | Fluorophlogopite crystal content (wt. %) |
| 24 | Si(OC$_2$H$_5$)$_4$ | MgSiF$_6$·6H$_2$O | 3 | Very good | 2080 | 1175 | Fluorophlogopite Sellaite | 45 |
| 25 | Si(OC$_2$H$_5$)$_4$ | K$_2$SiF$_6$ | 3 | Very good | 2020 | 1175 | Fluorophlogopite Sellaite | 45 |
| 26 | Al(OC$_3$H$_7$)$_3$ | AlCl$_3$ | 20 | Good | 1740 | 1100 | Fluorophlogopite Sellaite | 45 |
| 27 | Mg(OCH$_3$)$_2$ | MgSiF$_6$·6H$_2$O | 8 | Very good | 2080 | 1175 | Fluorophlogopite Sellaite | 45 |
| 28 | KOCH$_3$ | K$_2$SiF$_6$ | 20 | Very good | 2040 | 1175 | Fluorophlogopite Sellaite | 45 |
| 29 | KOCH$_3$ | KF | 60 | Very good | 2020 | 1150 | Fluorophlogopite Sellaite | 45 |
| 30 | Si(OC$_2$H$_5$)$_4$ | MgSiF$_6$·6H$_2$O | 10 | Very good | 2000 | 1175 | Fluorophlogopite Sellaite | 45 |
| 31 | Al(OC$_3$H$_7$)$_3$ | Al(NO$_3$)$_3$ | 20 | Good | 1800 | 1150 | Fluorophlogopite Sellaite | 45 |
| 32 | Si(OC$_2$H$_5$)$_4$ | K$_2$SiF$_6$ | 10 | Very good | 2050 | 1175 | Fluorophlogopite Sellaite | 45 |
| 33 | Mg(OCH$_3$)$_2$ | MgSiF$_6$·6H$_2$O | 10 | Very good | 2030 | 1175 | Fluorophlogopite Sellaite | 45 |
| 34 | KOCH$_3$ | KF | 100 | Very good | 2050 | 1175 | Fluorophlogopite Sellaite | 45 |

TABLE 3

| Comparative Example No. | Chemical composition (in terms of oxides, except F), wt. % | | | | | | Heat-treating conditions | | | | Properties of product | | |
|---|---|---|---|---|---|---|---|---|---|---|---|---|---|
| | | | | | | | First stage | | Second stage | | | | |
| | SiO$_2$ | Al$_2$O$_3$ | MgO | K$_2$O | B$_2$O$_3$ | F | Temperature (°C) | time (hr.) | Temperature (°C) | Time (hr.) | machinability | Flexural strength (kgf/cm$^2$) | Heat resistance (°C) | Crystalline phase |
| 1 | 44.0 | 15.0 | 16.0 | 10.0 | 7.0 | 8.0 | 750 | 4 | 1100 | 4 | Very good | 1200 | 1000 | Fluorophlogopite Sellaite |

TABLE 4

| Comparative Example No. | Chemical compositions (in terms of oxides, except F), wt. % | | | | | Properties of product | | | |
|---|---|---|---|---|---|---|---|---|---|
| | SiO$_2$ | Al$_2$O$_3$ | MgO | K$_2$O | F | Machinability | Flexural strength (kgf/cm$^2$) | Heat resistance (°C) | Crystalline phase |
| 2 | 65.0 | 10.6 | 11.2 | 7.3 | 5.9 | Poor | 720 | 920 | Fluorophlogopite Forsterite |
| 3 | 52.0 | 7.0 | 18.0 | 12.2 | 10.0 | Somewhat poor | 870 | 940 | Fluorophlogopite Forsterite |
| 4 | 52.1 | 17.7 | 8.0 | 12.2 | 10.0 | Somewhat poor | 850 | 940 | Fluorophlogopite Forsterite |
| 5 | 51.8 | 17.6 | 18.7 | 2.0 | 9.9 | Poor | 770 | 820 | Fluorophlogopite Forsterite |
| 6 | 51.1 | 17.4 | 18.5 | 12.0 | 1.0 | Poor | 680 | 740 | Fluorophlogopite Forsterite |
| 7 | 42.4 | 14.4 | 15.3 | 9.9 | 18.0 | Somewhat poor | 890 | 900 | Fluorophlogopite Forsterite |

We claim:

1. A glass-ceramic product having a flexural strength of not less than 1500 kg/cm$^2$, a heat resistance of about 1100° C., excellent dielectric properties, and good machinability and having a chemical composition, as expressed in terms of oxides with the exception of F, consisting essentially of the components in the weight range of 35 to 60% $SiO_2$, 10 to 20% $Al_2O_3$, 12 to 25% MgO, 5 to 15% $K_2O$ and 4 to 15%, F, containing no $B_2O_3$, and containing 40 to 70% by weight of fluorophlogopite microcrystals, the balance essentially a vitreous matrix.

2. The method of making glass-ceramic products containing 40 to 70% by weight of fluorophlogopite microcrystals the balance essentially a vitreous matrix which comprises the steps of dissolving, in a solvent consisting essentially of a polar solvent, (i) silcon, aluminum and magnesium compounds consisting largely of alkoxides thereof and (ii) potassium and fluorine compounds soluble in said solvent, in such properties as to provide a final product having a chemical composition, as expressed in terms of oxides with the exception of F, consisting essentially of the components in the weight range of 35 to 60% $SiO_2$, 10 to 20% $Al_2O_3$, 12 to 25% MgO, 5 to 15% $K_2O$ and 4 to 15% F; adding water to the starting material solution so formed to effect hydrolysis of said compounds; dehydrating and drying the resulting gel; and heat-treating the resulting dry solid.

3. The method of making glass-ceramic products as claimed in claim 2 wherein said potassium compound is an alkoxide of potassium.

4. The method of making glass-ceramic products as claimed in claim 2 wherein, with respect to at least one of silicon, aluminum and magnesium, another compound thereof soluble in polar solvents is used, as a starting material, in combination with the alkoxide thereof.

5. The method of making glass-ceramic products as claimed in claim 2 wherein said dehydration and drying step is carried out at a temperature of 25° to 130° C., and said heat-treating step includes the pretreatment step of heating said dry solid at a temperature of 500° to 800° C. for a period of 1 to 12 hours (first-stage heat treatment) and then at a temperature of 800° to 1100° C. for a period of 1 to 12 hours (second-stage heat treatment), the shaping step of reducing the pretreated solid to powder and forming it into a desired shape, and the calcination step of heating the shaped body at a temperature of 1100° to 1300° C. for a period of 1 to 15 hours (third-step heat treatment) to sinter the shaped body and to cause the growth of fluorophlogopite microcrystals at the same time.

6. The method of making glass-ceramic products as claimed in claim 3 wherein said dehydration and drying step is carried out at a temperature of 25° to 130° C., and said heat-treating step includes the pretreatment step of heating said dry solid at a temperature of 500° to 800° C. for a period of 1 to 12 hours (first-stage heat treatment) and then at a temperature of 800° to 1100° C. for a period of 1 to 12 hours (second-stage heat treatment), the shaping step of reducing the pretreated solid to powder and forming it into a desired shape, and the calcination step of heating the shaped body at a temperature of 1100° to 1300° C. for a period of 1 to 15 hours (third-step heat treatment) to sinter the shaped body and to cause the growth of fluorophlogopite microcrystals at the same time.

7. The method of making glass-ceramic products as claimed in claim 4 wherein said dehydration and drying step is carried out at a temperature of 25° to 130° C., and said heat-treating step includes the pretreatment step of heating said dry solid at a temperature of 500° to 800° C. for a period of 1 to 12 hours (first-stage heat treatment) and then at a temperature of 800° to 1100° C. for a period of 1 to 12 hours (second-stage heat treatment), the shaping step of reducing the pretreated solid to powder and forming it into a desired shape, and the calcination step of heating the shaped body at a temperature of 1100° to 1300° C. for a period of 1 to 15 hours (third-step heat treatment) to sinter the shaped body and to cause the growth of fluorophlogopite microcrystals at the same time.

* * * * *

UNITED STATES PATENT AND TRADEMARK OFFICE
CERTIFICATE OF CORRECTION

PATENT NO. : 4,777,151

DATED : Oct. 11, 1988

INVENTOR(S) : Keiichiro KOBA et al.

It is certified that error appears in the above-identified patent and that said Letters Patent is hereby corrected as shown below: On the Title Page, Item [75]:

The second inventor's name should be corrected to read as follows:

-- Akira Mathumoto --

Signed and Sealed this

Fourteenth Day of March, 1989

*Attest:*

DONALD J. QUIGG

*Attesting Officer*  *Commissioner of Patents and Trademarks*